(No Model.)  3 Sheets—Sheet 2.
G. W. THOMAS.
CABLE RAILWAY FOR PLANTATIONS.
No. 302,797. Patented July 29, 1884.
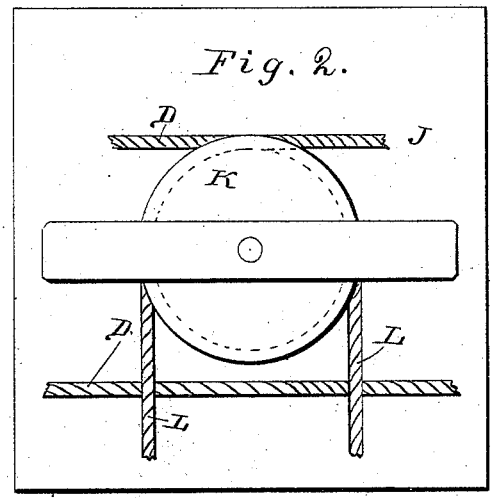
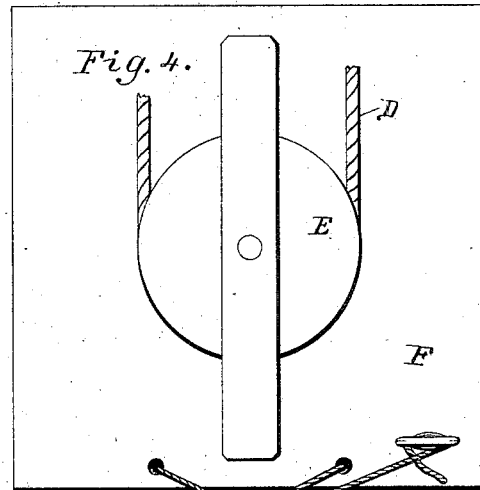
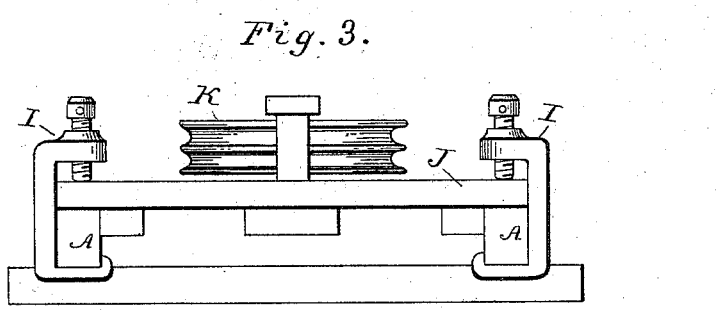
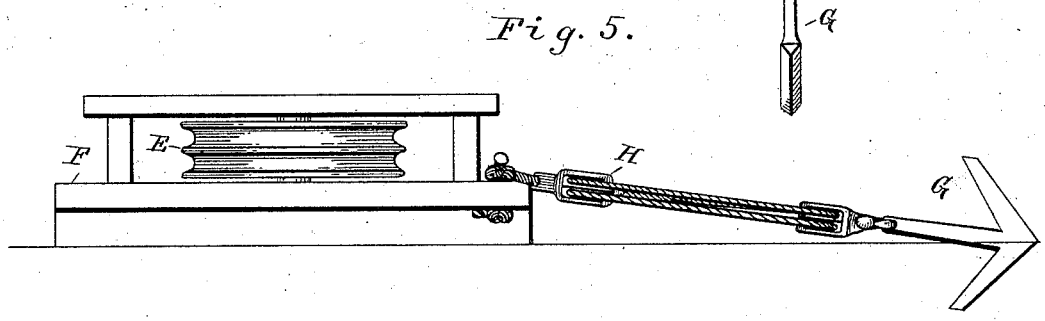
WITNESSES:
Thos. Houghton.
A. G. Lyne.
INVENTOR:
G. W. Thomas
BY Munn & Co.
ATTORNEYS.

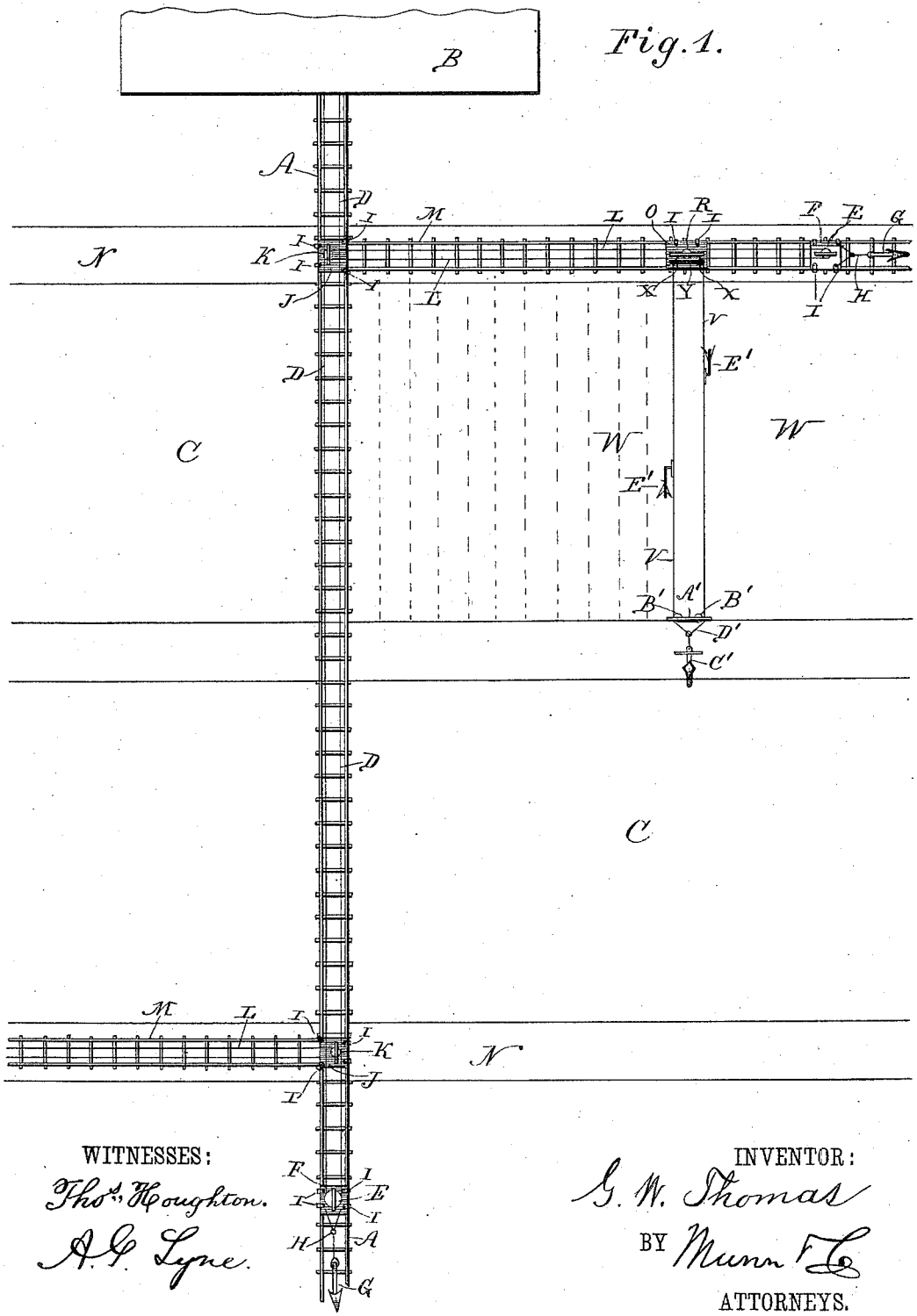

(No Model.)  3 Sheets—Sheet 3.
G. W. THOMAS.
CABLE RAILWAY FOR PLANTATIONS.
No. 302,797. Patented July 29, 1884.
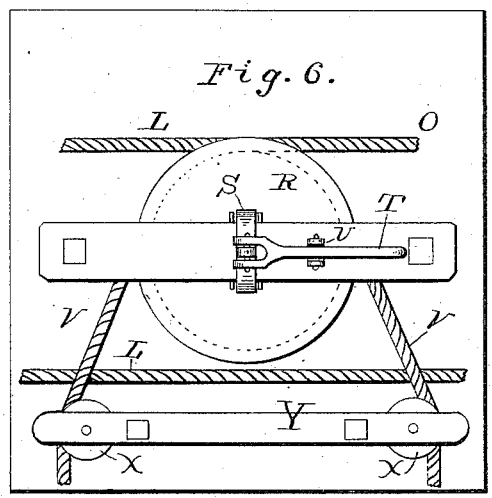
Fig. 6.
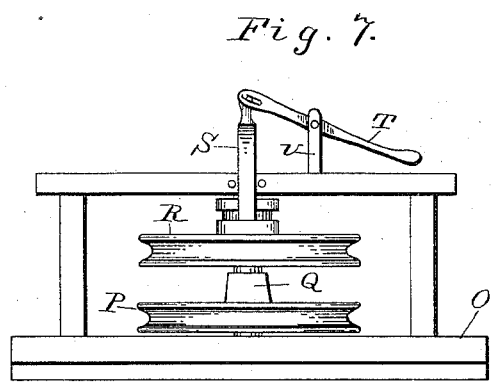
Fig. 7.
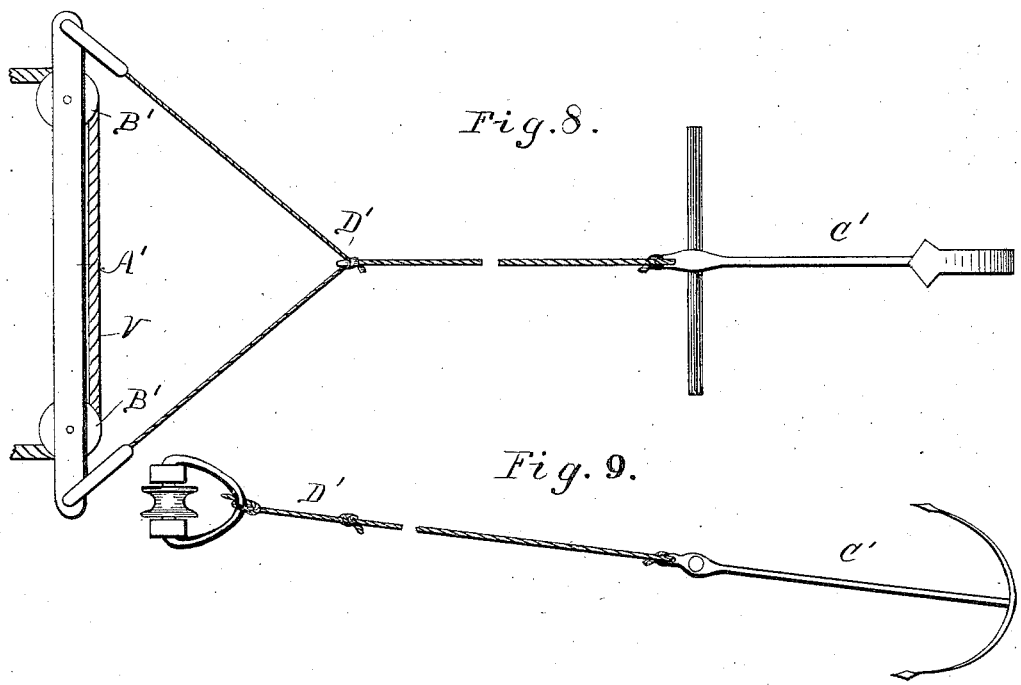
Fig. 8.
Fig. 9.
WITNESSES:
Thos. Houghton.
A. G. Lyne
INVENTOR:
G. W. Thomas
BY Munn & Co.
ATTORNEYS.

UNITED STATES PATENT OFFICE.

GEORGE W. THOMAS, OF CYPRE MORT, LOUISIANA.

CABLE RAILWAY FOR PLANTATIONS.

SPECIFICATION forming part of Letters Patent No. 302,797, dated July 29, 1884.

Application filed May 26, 1884. (No model.)

*To all whom it may concern:*

Be it known that I, GEORGE WASHINGTON THOMAS, of Cypre Mort, in the parish of St. Mary's and State of Louisiana, have invented a new and useful Improvement in Cable Railways for Plantations, of which the following is a full, clear, and exact description, reference being had to the annexed drawings, forming part of this specification.

This invention consists of an improvement on the portable railway exhibited in Letters Patent of the United States No. 257,410, granted to me under date of May 2, 1882. In said patent I have shown a portable railway formed in sections adapted to be laid through a plantation to provide a main road and branch roads connecting with the main road by removable turn-tables.

My present invention has for its object to combine with such a plantation-railway a system of endless cables for propelling cars over the track, and also for drawing agricultural implements across fields in the planting, cultivating, and harvesting of crops.

In the drawings, Figure 1 is a diagram illustrating my invention. Figs. 2 and 3 are an enlarged plan view and elevation of a double pulley and its supporting-platform to be used at an intermediate point on the main cable for connecting a branch cable therewith. Figs. 4 and 5 are a plan and elevation of a pulley and platform for the termini of main and branch cables. Figs. 6 and 7 are a plan and elevation of an intermediate movable platform and pulleys to be used in connecting with a driven cable a branch cable for drawing plows and other farming implements in the cultivation of crops; and Figs. 8 and 9 are a plan and elevation of an anchoring device for the terminus of a branch cable for drawing plows, &c.

A indicates a railroad extending from the sugar-house B through the middle of a plantation, C. An endless cable, D, is laid above this track on horizontal pulleys, and is to be driven by the engine usually employed in the sugar-house. The terminal pulley E is supported on a movable platform, F, which fits on and between the rails of the track A. This platform is provided with an anchor, G, which is connected therewith by the tackle H, to take up the slack in the cable after the anchor is set, and the platform is finally to be secured to the track by clamps I, as shown in Fig. 3.

At points along the main track and cable are located intermediate platforms, J, supporting pulleys K, around each of which one of the strands of the cable D is passed, while in a separate groove of each pulley K is arranged a branch endless cable, L, which extends along the branch railway-track M, located in the cross turn-road N. This branch cable L is provided with a terminal pulley, E, and anchored platform F, similar to that above described. The intermediate platforms, J, are secured to the track by clamps I.

Between the platform J and the platform F of the branch cable L is located a movable platform, O, supporting a pulley, P, around which one strand of the cable is passed. This pulley is formed with a squared hub, Q, on which is loosely fitted a second pulley, R, and the pulley R is loosely connected to the stirrup S, which is connected to a lever, T, pivoted in a standard, U, in such manner that by depressing the handle of the lever the pulley R will be lifted out of engagement with the hub Q.

On the pulley R is arranged an endless cable, V, which is to be extended across a land, W, for drawing plows and other implements of agriculture.

The platform O is provided with two supplemental pulleys, X, supported in a bar, Y, about six feet long, for the purpose of spreading the strands of the cable, and a corresponding bar, A', having two pulleys, B', is connected to an anchor, C', by a tackle, D', for supporting the cable at the end opposite to the platform O. This cable L is to be shifted along by moving the platform O and anchor C' along the cross turn-roads N, between which the said cable is extended. The strands of this cable, being about six feet apart, may both be utilized for drawing plows E' across the land W in opposite directions in planting or cultivating sugar-cane and other crops. One or more movable cables L may be used to each land W, and these may be moved toward or from each other, as desired.

It is evident that my method of working lands may be carried out without the need of laying a railway. The platforms carrying the pulleys for the cables need only to be anchored or staked to the ground in proper position.

What I claim is—

1. The combination, with an endless cable supported above ground, of a supplemental endless cable and movable supports therefor, which are adapted to be anchored temporarily in any desired position, so that said cable may be shifted gradually along the line of the main or driving cable, as and for the purpose specified.

2. The combination, with an endless cable supported above ground, of a supplemental endless cable, a movable platform carrying a pulley for connecting the supplemental cable with the driving-cable, and an anchor for securing the terminus of the supplemental cable, and a tackle for taking up the slack of said cable, substantially as shown and described.

3. The combination, with an endless cable supported above ground, of a supplemental endless cable, a movable platform carrying a pulley which is driven by the driving-cable, and a pulley supported by a lever and stirrup above said pulley, and adapted to be moved thereby into and out of engagement with said pulley, a bar supported on said platform and carrying pulleys at its ends for spreading the strands of the supplemental cable as they extend from the said upper pulley, and an anchor and spreading-bar for the terminus of said supplemental cable, substantially as shown and described, and for the purpose set forth.

GEORGE W. THOMAS.

Witnesses:
 DAVID ALLEN,
 WALTER J. SUTHON.